United States Patent [19]

Tani et al.

[11] Patent Number: 4,954,399
[45] Date of Patent: Sep. 4, 1990

[54] POROUS POLYMER PARTICLES AND PREPARATION METHOD THEREOF

[75] Inventors: Sumio Tani, Neyagawa; Kazuhiko Kogoh, Osaka; Yuri Nozaki, Kurashiki; Kunihiro Oshima, Osaka, all of Japan

[73] Assignee: Kurashiki Boseki Kabushiki Kaisha, Kurashiki, Japan

[21] Appl. No.: 415,479

[22] Filed: Oct. 2, 1989

Related U.S. Application Data

[63] Continuation of Ser. No. 256,805, Oct. 12, 1988, abandoned.

[30] Foreign Application Priority Data

Oct. 13, 1987 [JP] Japan .................... 62-257896

[51] Int. Cl.$^5$ ............................. C08F 30/02
[52] U.S. Cl. ..................... 428/402; 526/274; 526/278
[58] Field of Search ................ 526/274, 278; 428/402

[56] References Cited

U.S. PATENT DOCUMENTS 3,992,477  11/1976  Dickie et al. .................... 428/461

FOREIGN PATENT DOCUMENTS 54-160300  12/1979  Japan .
62-53315  3/1987  Japan .

*Primary Examiner*—Joseph L. Schofer
*Assistant Examiner*—Jeffrey T. Smith
*Attorney, Agent, or Firm*—Armstrong, Nikaido, Marmelstein, Kubovcik & Murray

[57] ABSTRACT

The present invention provides the polymer particles prepared by polymerizing monomer components which comprise as at least a part of polymerizable components a monomer of the formula (I):

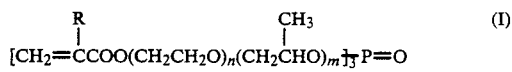

, wherein R is hydrogen atom or methyl group, n is a number of from 0 to 30 and m is a number of from 0 to 30 provided that m+n≧1 and a process for preparing the polymer particles.

8 Claims, No Drawings

POROUS POLYMER PARTICLES AND PREPARATION METHOD THEREOF

This application is a continuation of application Ser. No. 256,805 filed Oct. 12, 1988, now abandoned.

BACKGROUND OF THE INVENTION

The present invention relates to polymer particles, in particular polymer particles which are useful as a packing material for liquid chromatography and preparation method thereof.

Recently, polymer particles are employed in various fields such as adsorbents, cosmetics, paints, building materials, pharmaceuticals, analytical chemistry and the like. In some fields, polymer particles having solvent resistance, mechanical strength and the like are required and crosslinked polymer particles have developed for this purpose.

For example, polymer particles having hydrophilicity derived from vinyl alcohol which are prepared in the presence of triazine and used as a packing material for liquid chromatography are disclosed in Japanese Patent Laid Open No. 190003/1982 and polymer particles having hydrophilicity derived from carboxyl group and vinyl alcohol residue which are prepared in the presence of triazine as a crosslinking agent and used as a packing material for liquid chromatography are described in Japanese Patent Laid-Open No.232102/1984.

Although mechanical strength and solvent resistance which are required for the packing materials for liquid chromatography are improved by the crosslinkage in these polymer particles, they have several disadvantages. For example, in the case of separation of physiological active substances such as protein and the like which have polar hydrophilic groups such as carboxyl group, amino group and the like in addition to hydrophobic groups, nonspecific adsorption to the polymer particles occurs and recovery rate of the adsorbed substances is lowered because the polymer particles contain triazine ring. Furthermore, in the case of elution of the adsorbed physical active substances, the physiological active substances are denaturated and recovery rate thereof is decreased because strong eluent such as alcohol, strong acid and strong base is necessary to elute the adsorbed substances.

The object of the present invention is to provide polymer particles which do not bring about the aforementioned problems.

SUMMARY OF THE INVENTION

The present invention relates to polymer particles prepared by polymerizing monomer components which comprise as at least a part of polymerizable components a monomer of the formula (I):

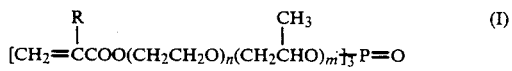

wherein R is hydrogen atom or methyl group, n is a number of from 0 to 30 and m is a number of from 0 to 30 provided that $m+n \geq 1$ and a process for preparing the polymer particles.

DETAILED DESCRIPTION OF THE INVENTION

The monomer (I) is phosphoric ester which contains 3 moles of ester formed from carboxylic acid having polymerizable double bond and alkylene glycol or polyalkylene glycol.

Typical carboxylic acids are acrylic acid and/or methacrylic acid. They are represented by (meth)acrylic acid in the present specification.

In the same manner, alkylene glycol and/or polyalkylene glycol are represented by (poly)alkylene glycol hereinafter. As a typical (poly)alkylene glycol, (poly)ethylene glycol, (poly)propylene glycol and block or random copolymer of ethylene oxide and propylene oxide are exemplified. Although hydrophilicity of the formed polymer particles is provided by these (poly)alkylene glycol chains, suitable values of n+m are about 30 at the most because mechanical strength of the polymer particles is decreased when the molecular weights of the polymer become too high. Preferable values of n or m are from 0 to 10 and the values of n+m are at least 1.

The monomer (I) can be prepared by the conventional reaction of phosphorus oxychloride and the aforementioned ester of (poly)alkylene glycol and (meth)acrylic acid.

The monomer (I) may contain different hydrophilic groups and polymerizable groups in the same molecular. For example, acrylic ester and methacrylic ester, (poly)ethylene glycol ester and (poly)propylene glycol ester or the groups which contain alkylene glycol chains having different molecule weights may coexist in one molecular of the monomer (I).

The polymer particles according to the present invention may be polymers of the monomer (I) itself which includes monomeric mixtures represented by the formula (I) or may be copolymer of the monomer (I) and the hydrophilic monomers.

The hydrophilic monomers which can be used in the present invention are those having hydrophilic groups which are polymerizable with the monomer (I) and preferably nonionic. Ionic monomers such as those having an amino group, carboxylate group, sulfonate group and the like bring about nonspecific adsorption caused by these functional groups when the polymer particles prepared by using said monomers are employed as a packing material for liquid chromatography. Therefore, ionic monomers are not preferred with the exception of the case where such a function is utilized, for example, as an ion-exchanger.

As a preferred hydrophilic monomer, the monomers having polymerizable double bond and hydroxyl group or oxyether group such as hydroxyethyl (meth)acrylate, hydroxypropyl (meth)acrylate, glycerin (meth)acrylate, pentaerythritol (meth)acrylate, oligoethylene glycol (meth)acrylate, oligopropylene glycol (meth) acrylate, alkylene glycol itaconate, oligoalkylene glycol itaconate, dialkylene glycol maleate, dioligoalkylene glycol maleate and the like are exemplified. The aforesaid oligoalkylene glycols such as oligoethylene glycol, oligopropylene glycol and the like are polymers of from about 2 to 10 alkylene oxides and are employed in order to give the monomer hydrophilicity. With the increase in the mole fraction of alkylene oxide, mechanical strength of the polymers is decreased. Plural unit of the hydrophilic monomers may be used.

The weight ratio of the monomer (I) to the hydrophilic monomer is from 100:0 to 1:99, preferably from 90:10 to 5:95, more preferably from 50:50 to 10:90.

The monomer (I) and the hydrophilic monomer may be polymerized simultaneously to form a random polymer. After polymerization of the monomer (I), the hydrophilic monomer may be reacted with the polymer to form a modified polymer, or after polymerization of the hydrophilic monomer, the monomer (I) may be reacted with the polymer to form crosslinked polymer. Furthermore, after oligomerization of the monomer (I) and the hydrophilic monomer, the both oligomers may be copolymerized to form a block polymer. At the time of the copolymerizations, it may be carried out by adding dropwise the monomer (I) or the hydrophilic monomer.

Particularly preferred processes for preparing the polymer particles by employing aforesaid monomers is to polymerize the monomer (I) and the optional hydrophilic monomer in an aqueous suspension in the presence of catalyst and the inert organic solvent which is immiscible with water.

As stated above, the reaction procedure of the monomer (I) and the hydrophilic monomer is not restricted. The hydrophilic monomer may be polymerized with the polymer prepared previously by polymerizing the monomer (I) or both monomer components may be polymerized simultaneously. Furthermore, the monomer (I) may be reacted with the polymer prepared previously by polymerizing the hydrophilic monomer or the polymerization may be carried out by adding the both monomer components alternately.

The monomer components may comprise crosslinking agent in addition to the monomer (I). As the crosslinking agent, hydrophilic crosslinking agents such as ethylene glycol di(meth)acrylate, propylene glycol di(meth)acrylate, glycerin di(meth)acrylate, pentaerythritol di(meth)acrylate, pentaerythritol tri(meth)acrylate, oligoethylene glycol di(meth)acrylate, oligopropylene glycol di(meth)acrylate and the like are exemplified.

The appropriate amount of the crosslinking agent used is less than 20 percent by weight based on the total amount of the monomer (I) and the crosslinking agent.

The monomer (I) and the crosslinking agent may be reacted simultaneously or the crosslinking agent may be reacted with the polymer prepared previously by polymerizing the monomer (I).

The monomer components may comprise the hydrophilic monomer and the crosslinking agent in addition to the monomer (I). The suitable amount of the crosslinking agent used in this case is less than 20 percent by weight based on the total amount of the monomer (I) and the crosslinking agent. These three reaction components may be reacted simultaneously or the monomer (I) and the hydrophilic monomer may be reacted to form the polymer which is then crosslinked by the crosslinking agent may be reacted with the polymer of the hydrophilic monomer.

Although the polymerization of the aforementioned monomers occurs in the nonaqueous solvent, the formed polymer precipitates without being dissolved in the solvent and may be suspended in water as a fine polymer particle when the polymerization proceeds to some extent. Accordingly, the polymer particles having well-regulated uniform grain sizes are obtained. Porous polymer particles having an excellent adsorptive property are produced when the organic solvent is removed from the polymer particles by washing or volatilization.

The inert organic solvent used for the preparation of the aforementioned polymer particles dissolves the monomer components and is not immiscible with water. As such an organic solvent, aromatic hydrocarbons such as benzene, toluene, xylene, tetralin and the like, alcohols such as butanol, amylalcohol, cyclohexanol, 2-ethyl hexanol and the like, ketones such as methyl ethyl ketone, methyl butyl ketone and the like and esters such as ethyl acetate, butyl acetate and the like are exemplified, Mixed solvents consisting of more than two solvents may be used in order to regulate solubility of the monomers and solubility, hydrophilicity and the like of the polymer formed within the suitable range.

The amount of the inert organic solvent used is from 1 to 500 percent by weight, preferably from 50 to 200 percent by weight based on the monomer components.

All of the monomer components or parts of the monomer components, for example, the monomer (I) and the hydrophilic monomer when these monomers are used in combination with the crosslinking agent, may be dissolved previously in the aforesaid organic solvents and polymerized in an aqueous suspension. Alternatively, the polymerization may be carried out by dropwise addition of the monomer components or parts thereof into an aqueous suspension of the organic solvents. In the case where parts of the monomer components are polymerized previously, the remains of the components may be used in the following polymerization reaction.

As the catalyst, a free radical polymerization initiator, redox polymerization initiator, oxidizing agent such as cerium salt and the like are used. The radical polymerization initiator which decomposes at reaction temperature, for example, acyl peroxides such as benzyl peroxide, lauroyl peroxide and the like, azonitriles such as azobisisobutylonitrile and the like are preferred. The amount of the radical polymerization initiator used is from 0.3 to 7 percents by weight, preferably from 0.5 to 5 percent by weight based on the total weight of the monomer (I), the hydrophilic monomer and the crosslinking agent.

The polymerization is carried out in an aqueous medium. In order to carry out the polymerization of the monomer (I) and/or the hydrophilic monomer in an organic solvent layer, it is preferable to dissolve suitable salts in water to suppress partition of the aforesaid monomers into water layer because these monomers are soluble in water. This is also applied to the case where the hydrophilic crosslinking agent is used in combination with the monomer (I) and/or hydrophilic monomer. As the salts, inorganic neutral salts such as sodium chloride, sodium sulfate, calcium chloride and the like may be used. However, the salts are not restricted to these inorganic neutral salts. Suitable amount of the salts used is from about 10 to 35 percent by weight.

The organic solvents and the monomer components may be suspended by physical means alone such as ultrasonic wave, homomixer and the like. However, dispersing agents may be used in combination with the physical means.

As the dispersing agent, natural polymers such as starch, gelatin and the like, modified natural polymers such as CMC, hydroxyethyl cellulose, methyl cellulose and the like and water soluble polymers such as polyvinyl alcohol, polyvinyl pyrrolidone, carbowax and the like are exemplified. The amount of the dispersing agent used is from 0.3 to 3 percent by weight, preferably from 0.5 to 1.5 percent by weight based on water.

The reaction temperature is from 20° to 150° C., preferably from 40° to 100° C.

Pore capacities and pore sizes of the polymer particles formed can be regulated by changing the amount of the inert organic solvents used and combinations of the inert organic solvents. Mechanical strength and hydrophilicity of the polymer particles can be regulated by the amounts of the monomer (I), hydrophilic monomer and crosslinking agent used. The polymer particles whose grain sizes are from 1 to 1000μ and whose mean pore sizes are from 30 to 5000Å can easily be obtained by means of these variations.

The crosslinked hydrophilic polymer particles according to the present invention not only do not bring about nonspecific adsorption of protein because of high hydrophilicity but also have an excellent property as a carrier for gel filtration because of high mechanical strength and porosity.

Furthermore, the polymer particles according to the present invention have an extremely excellent property as a functional gel such as a carrier for affinity chromatography, carrier for ion-exchange chromatography, carrier for hydrophobic chromatography, carrier for isoelectric focusing, carrier for immobilized enzyme and the like because various functional groups are formed by the reactions of hydroxyl group, epoxy group and the like on the surfaces of the polymer particles.

The present invention is illustrated by the following examples.

EXAMPLE 1

Tri(methacryloyloxyethyl)phosphoric acid (0.6g), 2-hydroxyethyl methacrylate (5.4g), 1-butanol (6g) and azobisisobutyronitrile (0.12g) were charged into four-neck flask (300 ml) equipped with reflux condenser, agitator and thermometer and then aqueous solution of hydroxyethyl cellulose (1 g) and sodium chloride (40 g) dissolved in distilled water (160 g) was added. The mixture was heated at 70° C. for 1 hour and then at 80° C. for 4 hours under agitation (350rpm). Spherical copolymer particles whose grain sizes are from 30 to 60 μm were formed. The polymer particles were washed with water sufficiently, rinsed with methanol and then dried. The polymer particles whose mean pore sizes are 1300Å (measured by porosimeter) were obtained. "K-1" refers to the polymer particles hereinafter.

EXAMPLE 2

Tri(methacryloyloxyethyl)phosphoric acid (0.6 g), 2-hydroxyethylmethacrylate (5.4 g), benzene (6 g) and azobisisobutyronitorile (0.12 g) were charged into the same reaction vassel as that described in Example 1 and then aqueous solution of hydroxyethyl cellulose (1 g) and sodium chloride (40 g) dissolved in distilled water (160 g). The mixture was heated at 50° C. for 1 hour and then at 65° C. for 4 hours under agitation (350rpm). Spherical copolymer particles whose grain sizes are from 100 to 500μm were formed. After the same posttreatment as that described in Example 1, the polymer particles whose mean pore sizes are 2000Å were obtained. "K-2" refers to the polymer particles hereinafter.

EXAMPLE 3

Polymerization was carried out under the same condition as that described in Example 1 with the exception that 3 g of tri(methacryloyloxyethyl) phosphoric acid and 3 g of 2-hydroxyethyl methacrylate were used. After the same posttreatment as that described in Example 1, the polymer particles whose grain sizes are from 100 to 500μm and whose mean pore sizes are 1500Å were obtained. "K-3" refers to the polymer particles hereinafter.

EXAMPLE 4

Polymerization was carried out under the same condition as that described in Example 1 with the exception that 1.2 g of tri(acryloyloxyethyl) phosphoric acid was used in place of tri(methacryloloxyethyl) phosphoric acid. After the same posttreatment as that of Example 1, the polymer particles whose grain sizes are from 50 to 100μm and whose mean pore sizes are 1300Å were obtained. "K-4" refers to the polymer particles hereinafter.

COMPARATIVE EXAMPLE 1

Polymerization was carried out under the same condition as that described in Example 1 with the exception that triallylisocyanurate (0.7 g) was used in place of tri(methacryloyloxyethyl)phosphoric acid. After the same posttreatment as that of Example 1, the polymer particles whose grain sizes are from 50 to 100μm and whose mean pore sizes are 1300Å were obtained. "R-1" refers to the polymer particles hereinafter.

EXAMPLE 5

Phosphoric acid buffer solution of protein was prepared by dissolving 30 mg of commercially available protein (bovine serum albumin or γ-globulin). K-1, K-2, K-3, K-4 or R-1 was allowed to stand overnight in (1/15)M phosphoric acid buffer and then the solvent was filtered off under reduced pressure using a of glass funnel. Five grams of each gel contained were weighted and immersed in the prepared protein solutions under agitation at room temperature for 30 minutes. Thereafter the polymer particles were filtered off and the filtrates were sampled and then recovery rates of the proteins were calculated by measuring the absorbance at 280nm.

The results obtained are shown in Table-1. As seen from Table-1, while about 10 percents of the proteins were adsorbed by R-1, the proteins were not adsorbed at all by K-1, K-2, K-3 and K-4.

TABLE 1

| Polymer articles | Recovery Rate (%) | |
|---|---|---|
| | bovine serum albumin | γ-globulin |
| K-1 (Example 1) | 100 | 100 |
| K-2 Example 2) | 101 | 102 |
| K-3 (Example 3) | 100 | 100 |
| K-4 (Example 4) | 100 | 101 |
| R-1 (Comparative Example 1) | 87 | 90 |

We claim:

1. Porous polymer particles prepared by the process of polymerizing monomers comprising a compound according to formula (I):

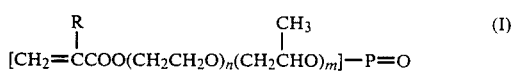

$$[CH_2=CRCOO(CH_2CH_2O)_n(CH_2CHO)_m]-P=O \quad (I)$$

(with CH₃ on the CHO group)

wherein R is hydrogen or methyl, n is 0 to 30, m is 0 to 30, with the proviso that $m+n>1$,
and a hydrophilic monomer polymerizable with said compound according to formula (I), wherein the weight ratio of the compound according to formula (I) and the hydrophilic monomer is between 50:50 and 10:90, and wherein said pore size of said particles is between 30 and 5000 Å.

2. The polymer particles according to claim 1, in which m is 0 and n is a number of from 1 to 10.

3. The polymer particles according to claim 1, in which the hydrophilic monomer is an ester of polyhydric alcohol and a polymerizable monomer having α, β-ethylenic unsaturated bond.

4. The polymer particles according to claim 1, in which the hydrophilic monomer is the one selected from the class consisting of hydroxyethyl (meth)acrylate, hydroxypropyl (meth)acrylate, glycerine (meth)acrylate, pentaerythritol (meth)acrylate, oligoethylene glycol (meth)acrylate and oligopropylene glycol (meth)acrylate.

5. The polymer particles according to claim 1, in which the polymer of the monomer (I) is crosslinked by crosslinking agent.

6. The polymer particles according to claim 1, in which copolymer of the monomer (I) and the hydrophilic monomer is crosslinked by crosslinking agent.

7. The polymer particles according to claim 6, in which the monomer components comprise less than 20 percents by weight of the crosslinking agent based on the total weight of the monomer (I) and the crosslinking agent and weight ratio of the monomer (I) and the crosslinking agent to the hydrophilic monomer is from 50:50 to 10:90.

8. The polymer particles according to claim 1, in which mean grain size is from 1 to 1000μm.

* * * * *